US012546662B2

(12) United States Patent
Miyoshi et al.

(10) Patent No.: US 12,546,662 B2
(45) Date of Patent: Feb. 10, 2026

(54) CORRECTION APPARATUS, CORRECTION SYSTEM, CORRECTION METHOD, AND NON-TRANSITORY COMPUTER-READABLE MEDIUM

(71) Applicant: NEC Corporation, Tokyo (JP)

(72) Inventors: Ayumi Miyoshi, Tokyo (JP); Makoto Kataoka, Tokyo (JP); Shihono Mochizuki, Tokyo (JP); Ryota Yushina, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 18/291,429

(22) PCT Filed: Aug. 2, 2021

(86) PCT No.: PCT/JP2021/028593

§ 371 (c)(1),
(2) Date: Jan. 23, 2024

(87) PCT Pub. No.: WO2023/012862

PCT Pub. Date: Feb. 9, 2023

(65) Prior Publication Data

US 2024/0230418 A1 Jul. 11, 2024

(51) Int. Cl.
*G01J 5/80* (2022.01)
*A61B 5/01* (2006.01)
(Continued)

(52) U.S. Cl.
CPC ................ *G01J 5/80* (2022.01); *A61B 5/015* (2013.01); *G01J 5/0011* (2013.01); *G01J 5/48* (2013.01);
(Continued)

(58) Field of Classification Search
CPC ... G01J 5/80; G01J 5/0011; G01J 5/48; G06V 40/10; H04N 23/23; A61B 5/015; A61B 2560/0252
See application file for complete search history.

(56) References Cited

U.S. PATENT DOCUMENTS 11,204,281 B1 * 12/2021 Ouellette ............. G06V 40/166
2016/0210747 A1 * 7/2016 Hay .................... G06F 16/7335
(Continued)

FOREIGN PATENT DOCUMENTS

JP 2018-183564 A 11/2018

OTHER PUBLICATIONS

International Search Report for PCT Application No. PCT/JP2021/028593, mailed on Oct. 19, 2021.

*Primary Examiner* — Dixomara Vargas
(74) *Attorney, Agent, or Firm* — Sughrue Mion, PLLC

(57) ABSTRACT

There is provided a correction apparatus comprising: a calculation unit configured to acquire a body surface temperature of a first person who has stayed outdoors for a predetermined time or longer from a video image captured by a thermal camera and calculating, on the basis of a result of measurement of a body temperature of the first person, a correction value to be used for correcting the body surface temperature of the first person; and a correction unit configured to acquire a body surface temperature of a second person different from the first person from a video image captured by the thermal camera and correct a body surface temperature of the second person on the basis of the correction value.

13 Claims, 7 Drawing Sheets

500
CALCULATE CORRECTION VALUE
ANALYZE VIDEO IMAGE
· ESTIMATE AGE
· ESTIMATE OUTDOOR ACTIVITY TIME
...
510
520
ESTIMATED AGE
CALCULATED CORRECTION VALUE
ESTIMATED OUTDOOR ACTIVITY TIME
ISSUE ALERT
530
600
CONFIRM ALERT NOTIFICATION
ALARM

(51) Int. Cl.

| | |
|---|---|
| ***G01J 5/00*** | (2022.01) |
| ***G01J 5/48*** | (2022.01) |
| ***G06V 40/10*** | (2022.01) |
| ***H04N 23/23*** | (2023.01) |

(52) U.S. Cl.

CPC ............. *G06V 40/10* (2022.01); *H04N 23/23* (2023.01); *A61B 2560/0252* (2013.01)

(56) References Cited

U.S. PATENT DOCUMENTS

| | | | | |
|---|---|---|---|---|
| 2018/0046778 | A1 | 2/2018 | Jiang et al. | |
| 2021/0003454 | A1* | 1/2021 | Ruther | H04N 17/002 |
| 2021/0076007 | A1* | 3/2021 | Correnti | G06Q 50/16 |
| 2021/0251568 | A1* | 8/2021 | Shayne | G16H 40/67 |
| 2021/0259557 | A1* | 8/2021 | Frank | A61B 5/6814 |
| 2021/0304584 | A1* | 9/2021 | Singh | G01J 5/07 |
| 2021/0373676 | A1* | 12/2021 | Jorasch | A63F 13/215 |
| 2022/0011165 | A1* | 1/2022 | Kuybeda | H04N 25/677 |
| 2022/0018715 | A1* | 1/2022 | Moton, Jr. | G06V 40/166 |
| 2022/0146319 | A1* | 5/2022 | Chang | G01J 5/53 |
| 2022/0189280 | A1* | 6/2022 | Singh | G08B 21/182 |
| 2022/0343674 | A1* | 10/2022 | Schmidt | G06T 7/70 |
| 2023/0075679 | A1* | 3/2023 | Zhang | G01J 5/80 |
| 2023/0228626 | A1* | 7/2023 | Shim | H04N 23/20<br>374/121 |
| 2024/0249447 | A1* | 7/2024 | Connor | G06T 1/20 |
| 2024/0289946 | A1* | 8/2024 | Durvasula | A61B 5/0816 |

* cited by examiner

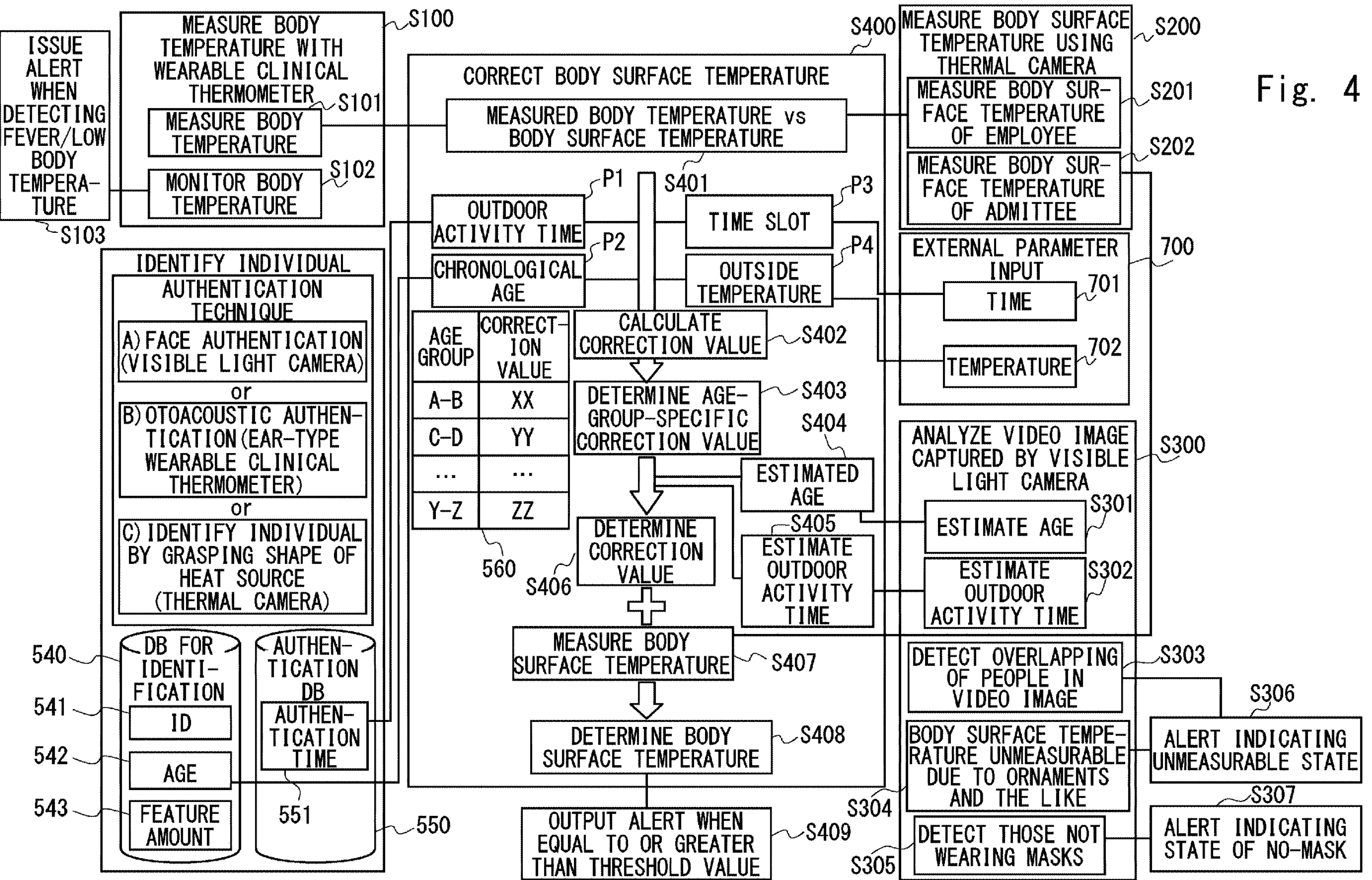
Fig. 4
S100
MEASURE BODY TEMPERATURE WITH WEARABLE CLINICAL THERMOMETER
S101
MEASURE BODY TEMPERATURE
S102
MONITOR BODY TEMPERATURE
S103
ISSUE ALERT WHEN DETECTING FEVER/LOW BODY TEMPERATURE
IDENTIFY INDIVIDUAL
AUTHENTICATION TECHNIQUE
A) FACE AUTHENTICATION (VISIBLE LIGHT CAMERA)
or
B) OTOACOUSTIC AUTHENTICATION (EAR-TYPE WEARABLE CLINICAL THERMOMETER)
or
C) IDENTIFY INDIVIDUAL BY GRASPING SHAPE OF HEAT SOURCE (THERMAL CAMERA)
540
DB FOR IDENTIFICATION
541
ID
542
AGE
543
FEATURE AMOUNT
550
AUTHENTICATION DB
AUTHENTICATION TIME
551
S400
CORRECT BODY SURFACE TEMPERATURE
MEASURED BODY TEMPERATURE vs BODY SURFACE TEMPERATURE
S401
P1
OUTDOOR ACTIVITY TIME
P2
CHRONOLOGICAL AGE
P3
TIME SLOT
P4
OUTSIDE TEMPERATURE
AGE GROUP
CORRECTION VALUE
A-B
XX
C-D
YY
…
…
Y-Z
ZZ
560
S402
CALCULATE CORRECTION VALUE
S403
DETERMINE AGE-GROUP-SPECIFIC CORRECTION VALUE
S404
ESTIMATED AGE
S405
ESTIMATE OUTDOOR ACTIVITY TIME
S406
DETERMINE CORRECTION VALUE
S407
MEASURE BODY SURFACE TEMPERATURE
S408
DETERMINE BODY SURFACE TEMPERATURE
S409
OUTPUT ALERT WHEN EQUAL TO OR GREATER THAN THRESHOLD VALUE
S200
MEASURE BODY SURFACE TEMPERATURE USING THERMAL CAMERA
S201
MEASURE BODY SURFACE TEMPERATURE OF EMPLOYEE
S202
MEASURE BODY SURFACE TEMPERATURE OF ADMITTEE
700
EXTERNAL PARAMETER INPUT
701
TIME
702
TEMPERATURE
S300
ANALYZE VIDEO IMAGE CAPTURED BY VISIBLE LIGHT CAMERA
S301
ESTIMATE AGE
S302
ESTIMATE OUTDOOR ACTIVITY TIME
S303
DETECT OVERLAPPING OF PEOPLE IN VIDEO IMAGE
S304
BODY SURFACE TEMPERATURE UNMEASURABLE DUE TO ORNAMENTS AND THE LIKE
S305
DETECT THOSE NOT WEARING MASKS
S306
ALERT INDICATING UNMEASURABLE STATE
S307
ALERT INDICATING STATE OF NO-MASK

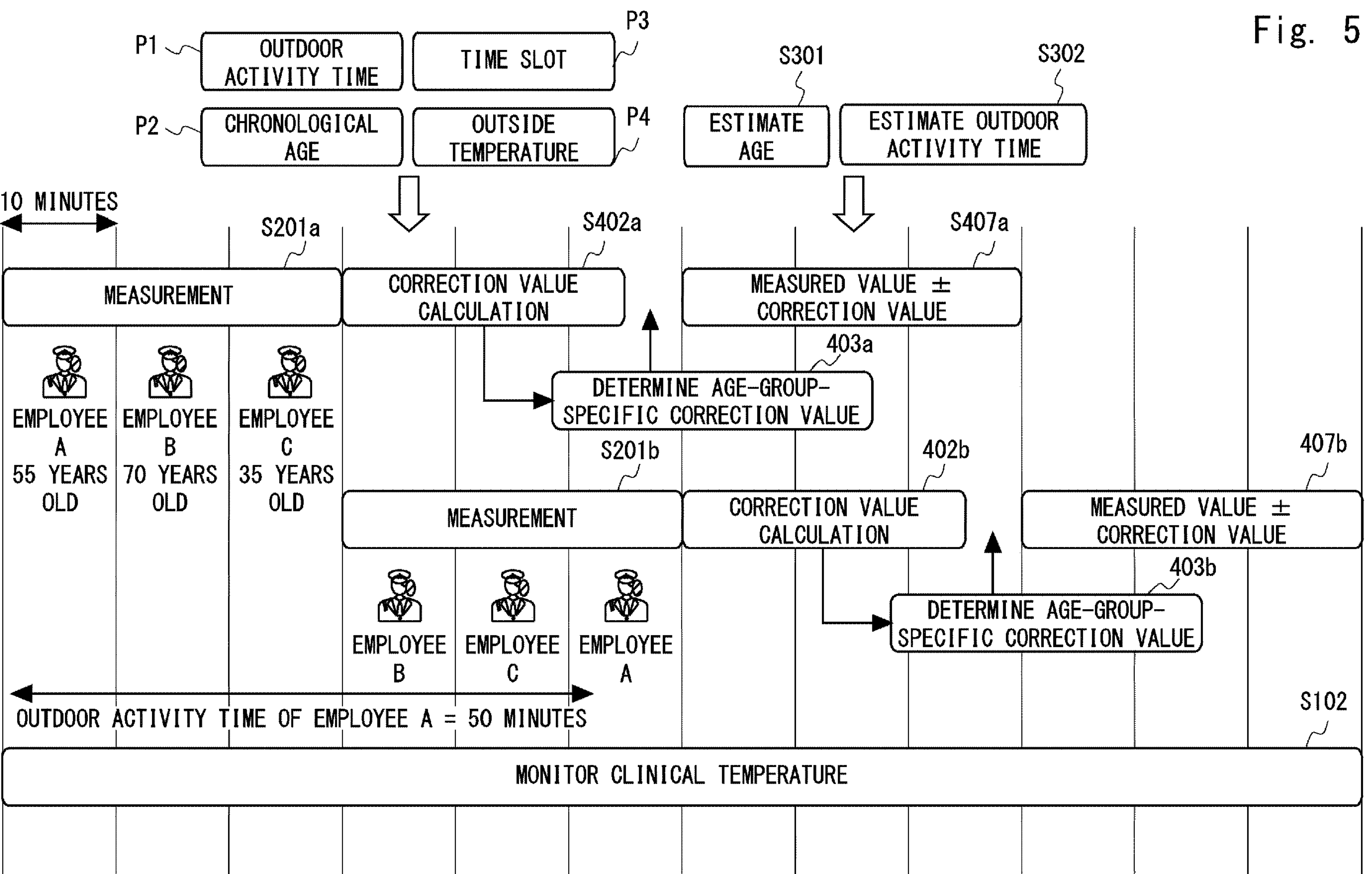
Fig. 5
P1
OUTDOOR ACTIVITY TIME
P3
TIME SLOT
P2
CHRONOLOGICAL AGE
P4
OUTSIDE TEMPERATURE
S301
ESTIMATE AGE
S302
ESTIMATE OUTDOOR ACTIVITY TIME
10 MINUTES
S201a
MEASUREMENT
EMPLOYEE A 55 YEARS OLD
EMPLOYEE B 70 YEARS OLD
EMPLOYEE C 35 YEARS OLD
S402a
CORRECTION VALUE CALCULATION
S407a
MEASURED VALUE ± CORRECTION VALUE
403a
DETERMINE AGE-GROUP-SPECIFIC CORRECTION VALUE
S201b
MEASUREMENT
EMPLOYEE B
EMPLOYEE C
EMPLOYEE A
402b
CORRECTION VALUE CALCULATION
407b
MEASURED VALUE ± CORRECTION VALUE
403b
DETERMINE AGE-GROUP-SPECIFIC CORRECTION VALUE
OUTDOOR ACTIVITY TIME OF EMPLOYEE A = 50 MINUTES
S102
MONITOR CLINICAL TEMPERATURE

560

| AGE GROUP | 8:00-8:29 | 8:30-8:59 |
|---|---|---|
| | CORRECTION VALUES | CORRECTION VALUES |
| A~B | XX | XX' |
| C~D | YY | YY' |
| E~F | ZZ | ZZ' |
| ... | ... | ... |
| Y~Z | XY | XY' |
| ... | ... | ... |

Fig. 6

CORRECTION APPARATUS, CORRECTION SYSTEM, CORRECTION METHOD, AND NON-TRANSITORY COMPUTER-READABLE MEDIUM

This application is a National Stage Entry of PCT/JP2021/028593 filed on Aug. 2, 2021, the contents of all of which are incorporated herein by reference, in their entirety.

TECHNICAL FIELD

The present disclosure relates to a correction apparatus, a correction system, a correction method, and a non-transitory computer-readable medium, and in particular, to a correction apparatus, a correction system, a correction method, and a non-transitory computer-readable medium for correcting a body surface temperature measured using a thermal camera.

BACKGROUND ART

During the COVID-19 pandemic, to screen persons entering facilities to determine whether or not they have a fever, body surface temperatures (human body surface temperatures) of the persons entering the facilities were measured using thermal cameras. An advantage of such a method is that a body surface temperature can be measured in a non-contact manner on the spot, although strictly speaking, a body surface temperature is not the same as a body temperature.

To screen those entering a facility to determine whether or not they have a fever, a thermal camera may be installed near the entrance of the facility. In such a case, there arises a problem that the result of measurement of a body surface temperature is affected by the outside temperature.

Patent Literature 1 discloses a technique related to a core body temperature measurement apparatus for measuring a core body temperature with high precision using a thermal image.

CITATION LIST

Patent Literature

Patent Literature 1: Japanese Unexamined Patent Application Publication No. 2018-183564

SUMMARY OF INVENTION

Technical Problem

As mentioned above, there is a problem that the precision of measurement of body surface temperatures decreases due to the influence of the outside temperature. This problem cannot be solved by the technique disclosed in Patent Literature 1.

The present disclosure has been made to solve the aforementioned problem, and an object of the present disclosure is to provide a correction apparatus, a correction system, a correction method, and a non-transitory computer-readable medium each adapted to improve the precision of measurement of body surface temperatures.

Solution to Problem

According to a first aspect of the present disclosure, a correction apparatus includes:

calculation means for acquiring a body surface temperature of a first person who has stayed outdoors for a predetermined time or longer from a video image captured by a thermal camera and calculating, on the basis of a result of measurement of a body temperature of the first person, a correction value to be used for correcting a body surface temperature; and correction means for acquiring a body surface temperature of a second person different from the first person from a video image captured by the thermal camera and correcting a body surface temperature of the second person on the basis of the correction value.

According to a second aspect of the present disclosure, a correction system includes:

a thermal camera; and a correction apparatus, in which the correction apparatus is configured to:

acquire a body surface temperature of a first person who has stayed outdoors for a predetermined time or longer from a video image captured by a thermal camera and calculate, on the basis of a result of measurement of a body temperature of the first person, a correction value to be used for correcting a body surface temperature; and measure a body surface temperature of a second person different from the first person using the thermal camera and correct a body surface temperature of the second person on the basis of the correction value.

According to a third aspect of the present disclosure, a correction method implemented by a computer includes:

acquiring a body surface temperature of a first person who has stayed outdoors for a predetermined time or longer from a video image captured by a thermal camera and calculating, on the basis of a result of measurement of a body temperature of the first person, a correction value to be used for correcting a body surface temperature; and acquiring a body surface temperature of a second person different from the first person from a video image captured by the thermal camera and correcting a body surface temperature of the second person on the basis of the correction value.

According to a fourth aspect of the present disclosure, a non-transitory computer-readable medium stores a correction program for causing a computer to perform processing of:

acquiring a body surface temperature of a first person who has stayed outdoors for a predetermined time or longer from a video image captured by a thermal camera and calculating, on the basis of a result of measurement of a body temperature of the first person, a correction value to be used for correcting a body surface temperature; and acquiring a body surface temperature of a second person different from the first person from a video image captured by the thermal camera and correcting a body surface temperature of the second person on the basis of the correction value.

Advantageous Effects of Invention

According to the present disclosure, it is possible to provide a correction apparatus, a correction system, a correction method, and a non-transitory computer-readable medium for improving precision of measurement of body surface temperatures.

BRIEF DESCRIPTION OF DRAWINGS

FIG. 4 is a schematic flowchart schematically showing a flow of a correction method according to the second example embodiment;

FIG. 5 is a schematic time chart schematically showing a flow of a correction method according to the second example embodiment;

FIG. 6 shows an age-group-specific correction table generated by the correction apparatus according to the second example embodiment.

EXAMPLE EMBODIMENT

Hereinafter, example embodiments of the present disclosure will be described in detail with reference to the drawings. In each drawing, the same or corresponding elements are denoted by the same reference symbols, and duplicate descriptions will be omitted as necessary for clarity of description.

First Example Embodiment

Figure 1:
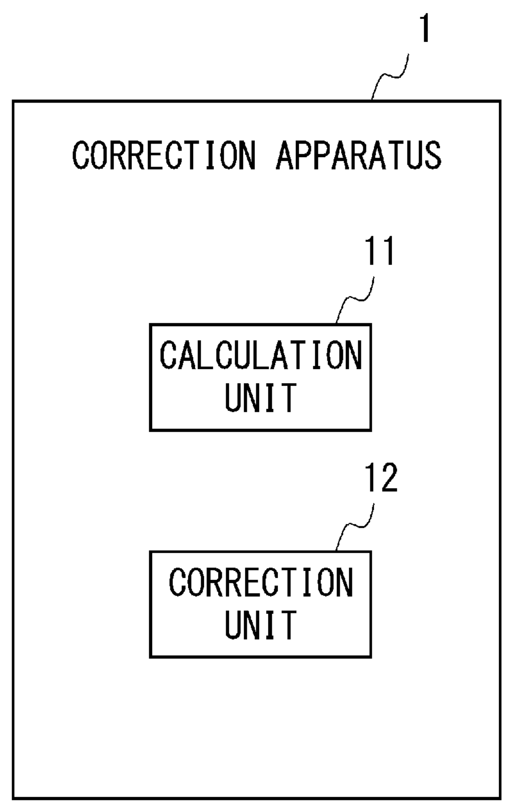
FIG. 1 is a block diagram showing an overall configuration of a correction apparatus according to a first example embodiment.

FIG. 1 is a block diagram showing an overall configuration of a correction apparatus 1 according to a first example embodiment. The correction apparatus 1 is a computer that corrects a body surface temperature measured with a thermal camera so as to bring the body surface temperature to be read close to a body temperature.

The correction apparatus 1 is connected to a network (not shown). The correction apparatus 1 is connected to a thermal camera (not shown) via a network (not shown). The network (not shown) may be wired or wireless. A thermal camera (not shown) may be installed, for example, at an entrance of a facility.

The correction apparatus 1 includes a calculation unit 11 and a correction unit 12. The calculation unit 11 acquires a body surface temperature of a first person who has stayed outdoors for a predetermined time or longer from a video image captured by a thermal camera (not shown) and calculates a correction value to be used in correcting a body surface temperature on the basis of the result of measurement of a body temperature of the first person. The calculation unit 11 may generate a correction table showing a correspondence relation between a correction value for the first person and the attributes of the first person. The attributes of the first person shall be identified by performing authentication of the first person.

The first person may be, for example, an employee (e.g., a security guard) working outdoors at a facility. Note that the first person need not always be at outdoors. The first person may temporarily be at an entrance of the facility when measuring his/her body surface temperature. Specifically, the calculation unit 11 calculates the difference between the result of measurement of the body temperature and the result of measurement of the body surface temperature as a correction value.

For example, the body temperature of the first person may be obtained from a wearable clinical thermometer (not shown) worn by the first person. Alternatively, the body temperature of the first person may be measured at a temperature checking booth installed in the vicinity of a facility or the like.

The correction unit 12 acquires a body surface temperature of a second person different from the first person from a video image captured by a thermal camera (not shown) and corrects the body surface temperature of the second person on the basis of the correction value calculated by the calculation unit 11. The correction unit 12 may use the correction table described above to determine a correction value for the second person on the basis of the attributes of the second person. The attributes of the second person shall be identified by performing video image analysis, etc. Specifically, the second person may be an admittee to a facility such as a visitor to a facility or a facility employee different from the first person.

Thus, the correction apparatus according to the present example embodiment calculates a correction value for correcting a body surface temperature according to the body surface temperature and the body temperature of the first person staying outdoors. Therefore, the correction apparatus 1 according to the present example embodiment can correct the body surface temperature of the second person (for example, an admittee to a facility) different from the first person with high precision.

While the configuration of the correction apparatus 1 is not shown, it includes a processor, a memory, and a storage apparatus. In addition, a computer program according to which the processing for the correction method according to the present example embodiment is implemented is stored in the storage apparatus. The processor reads the computer program from the storage apparatus into the memory and executes the computer program. Thus, the processor realizes the functions of the calculation unit 11 and the correction unit 12.

Alternatively, the calculation unit 11 and the correction unit 12 may each be implemented in dedicated hardware. In addition, some or all of the components of each apparatus may be implemented by a general purpose or dedicated circuitry, a processor, or a combination thereof. These components may be configured by a single chip or by a plurality of chips connected to one another via a bus. Some or all of the components of each apparatus may be implemented by a combination of the above-mentioned circuitry, etc., and a program. A CPU (Central Processing Unit), a GPU (Graphics Processing Unit), an FPGA (field-programmable gate array), a quantum processor (quantum computer control chip), etc., may be used as a processor.

In addition, when some or all of the components of the correction apparatus 1 are realized by a plurality of information processing apparatuses, circuits, etc., the plurality of information processing apparatuses, circuits, etc., may be centralized or distributed. For example, the information processing apparatus, circuits, etc., may be realized in the form of a client-server system, a cloud computing system, etc., each of which is connected to one another via a communication network. Functions of the correction apparatus 1 may also be provided in a Saas (Software as a Service) format.

Second Example Embodiment

Figure 2:
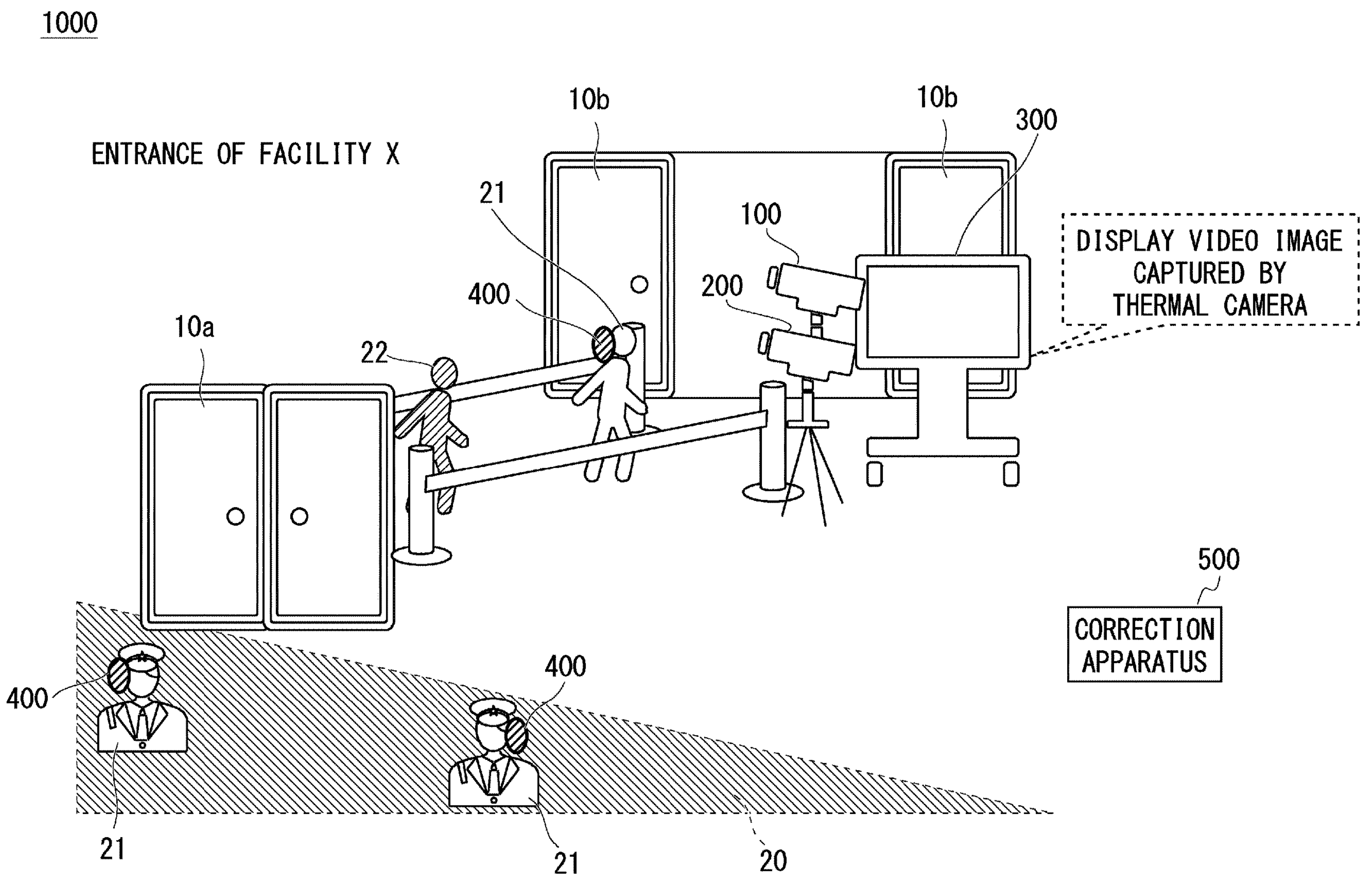
FIG. 2 is a schematic diagram of a correction system according to a second example embodiment.

A second example embodiment is a specific example of the first example embodiment described above. FIG. 2 is a schematic diagram showing a configuration of a correction system according to the present example embodiment. A correction system 1000 includes a thermal camera 100, a visible light camera 200, a display apparatus 300, a wearable clinical thermometer 400, and a correction apparatus 500.

The correction system 1000 is a system for measuring a body surface temperature of an admittee to a facility X (e.g., a commercial facility) and screening the admittee at an entrance of the facility X. There are doors 10*a* and 10*b* at the entrance of the facility X. The door 10*a* leads to outdoors 20, and the door 10*b* leads to the inside of facility X.

The thermal camera 100, the visible light camera 200, and the display apparatus 300 are installed at the entrance of the facility X. It is preferable that the image capturing region of the visible light camera 200 overlaps the image capturing region of the thermal camera 100. The thermal camera 100 and the visible light camera 200 may be configured as one camera.

The thermal camera 100 captures a video image (also referred to as a thermal image) of an employee 21 of the facility X and an admittee 22 other than the employee 21 (e.g., a visitor). The employee 21 corresponds to the first person described above, and the admittee 22 corresponds to the second person described above. The visible light camera 200 captures a visible light video image of the employee 21 and the admittee 22. The display apparatus 300 displays the thermal video image captured by the thermal camera 100. The display apparatus 300 also displays a value of the body surface temperature corrected by the correction apparatus 500, which will be described later. When the corrected body surface temperature of a person is higher than a set threshold, the display apparatus 300 displays this information on a screen so as to alert the person whose body surface temperature is higher than a set threshold value to the possibility that he/she has a fever.

At outdoors 20, the employee 21 (e.g., a security guard) of the facility X is working. The employee 21 wears the wearable clinical thermometer 400. The wearable clinical thermometer 400 is preferably an earphone-type clinical thermometer attached to, for example, the ear. This is because, in general, it takes less time to check a body temperature with an ear type clinical thermometer than it does to check the same with other types of thermometers and an ear type clinical thermometer is highly accurate in temperature measurement. The wearable clinical thermometer 400 transmits the result of measurement of the body temperature to the correction apparatus 500, which will be described later. The wearable clinical thermometer 400 may transmit the result of measurement of the body temperature on a periodic basis. According to the present example embodiment, the body temperature of the employee 21 can be monitored on a real time basis without the employee 21 having to measure his/her body temperature at a temperature checking booth.

A plurality of employees 21 shall be working at the facility X. Among the plurality of employees 21, some of them shall have different attributes (e.g., age) from one another. Further, the attributes (e.g., age) of each employee 21 shall be preregistered in the correction apparatus 500. Each employee 21 moves to the entrance of the facility X at each predetermined time and measures his/her body surface temperature using the thermal camera 100. For example, every employee 21 may pass by the thermal camera 100 and the visible light camera 200 about once every 30 minutes.

The correction apparatus 500 is a computer having a processor, memory, etc. The correction apparatus 500 is connected to the wearable clinical thermometer 400, the thermal camera 100, the visible light camera 200, and the display apparatus 300 via a network (not shown). The correction apparatus 500 includes a storage apparatus in which the ID and the attributes (e.g., age) of the employee 21 are registered. The functions of the correction apparatus 500 will be described later.

Figure 3:
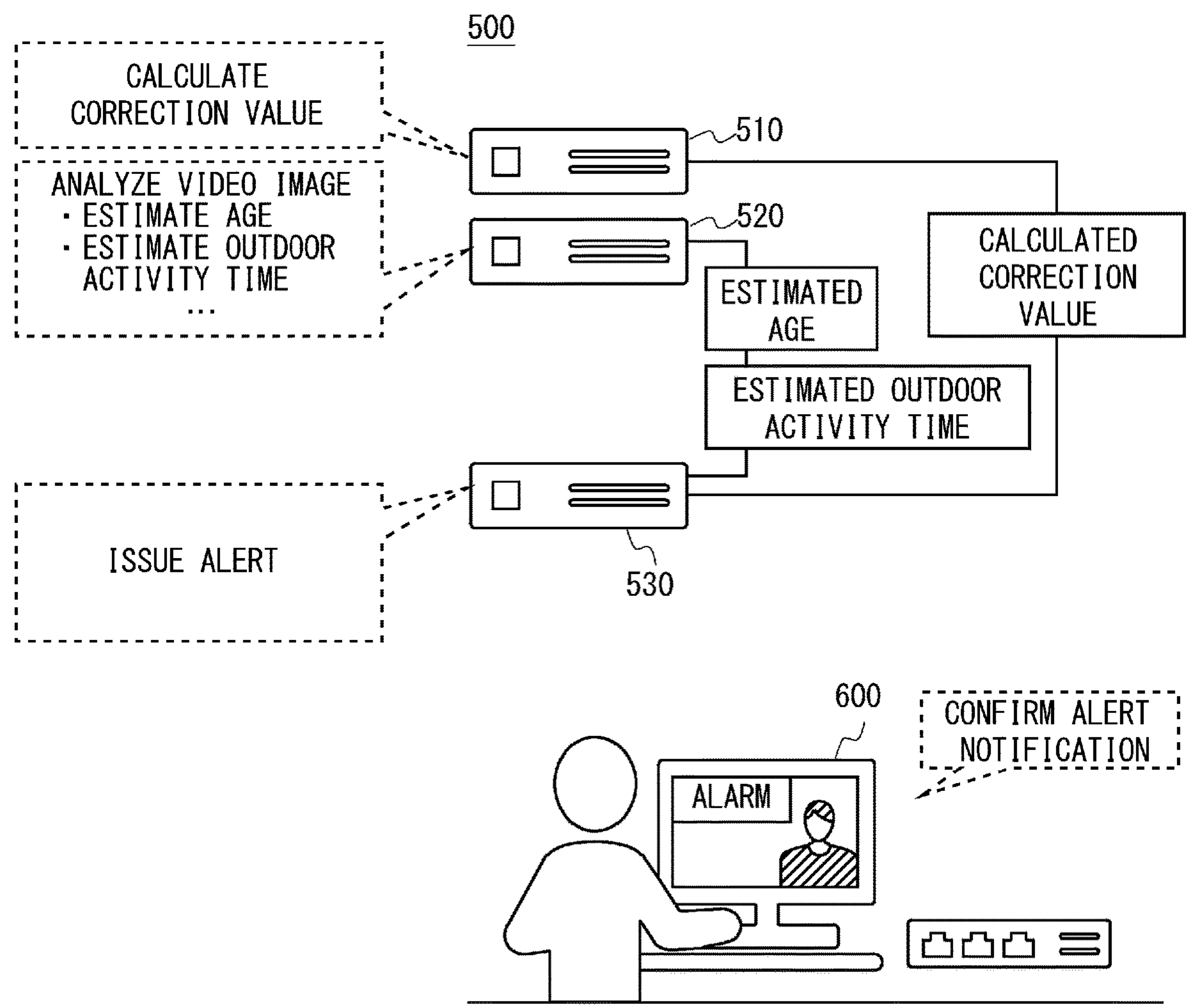
FIG. 3 is a schematic diagram showing a configuration of a correction apparatus according to the second example embodiment.

Next, the functions of the correction apparatus 500 will be described in detail with reference to FIG. 3. The correction apparatus 500 is a specific example of the correction apparatus 1 described above. The correction apparatus 500 includes a calculation unit 510, a video image analyzing unit 520, and a correction unit 530.

The calculation unit 510 is a specific example of the calculation unit 11 described above. The calculation unit 510 measures the body surface temperature of the employee 21 from the thermal video image captured by the thermal camera 100. Then, the calculation unit 510 performs processing for determining the difference between the result of measurement of the body temperature of the employee 21 performed by the wearable clinical thermometer 400 and the result of measurement of the body surface temperature of the employee 21.

The calculation unit 510 also has a function of performing personal authentication of an employee 21 using a DB (Data Base) that stores the biometric information about the employee 21. For example, the calculation unit 510 may include a function of detecting a facial region from a visible light video image and then controlling the face authentication of the employee 21. In addition, the calculation unit 510 may identify an individual by analyzing employee's clothing, etc. In addition, personal authentication of the employee 21 may be performed on the basis of the video image captured by the thermal camera 100, etc. Then, the calculation unit 510 performs identification of the employee 21 and then determines a correction value for correcting the body surface temperature taking into account the attributes (e.g., age) of the employee 21 and the parameters (e.g., the outside temperature, the outdoor activity time, and the time slot).

The calculation unit 510 outputs the calculated correction value to the correction unit 530. Here, the calculation unit 510 determines a correction value for each item of the attributes such as age and generates a correction table. As described above, there shall be a plurality of employees 21 whose attributes are different from one another.

The video image analyzing unit 520 analyzes the visible light video image captured by the visible light camera 200 and estimates the age of the admittee 22. Age estimation is performed by a known video image analysis technique. The video image analyzing unit 520 outputs the estimated age of the admittee 22 to the correction unit 530.

The video image analyzing unit 520 analyzes the visible light video image captured by the visible light camera 200 and estimates the outdoor activity time of the admittee 22. A second visible light camera shall be installed, for example, on a route from a parking lot, a bicycle parking facility, the nearest bus stop to the facility X, or the nearest station to the facility X. The video image analyzing unit 520 recognizes people and automatically registers their faces in the second visible light camera. When the person the same as one of those whose face has been registered in the second visible camera appears at the entrance of the facility X, the video image analyzing unit 520 estimates his/her outdoor activity time by the distance of the person from the second visible light camera. If the facility X is a hospital or a membership facility and the admittee 22 can be identified, the outdoor activity time of the admittee 22 may be estimated by associating the means of transportation (time required to each the facility on foot/by bicycle/by train/by bus/by car with the individual admittee 22 in advance and identifying the individual admittee 22 through a visible light camera 210 at the entrance of the facility X. That is, the individual admittee 22 and his/her outdoor activity time may be in correspondence with each other.

Depending on the estimated outdoor activity time, a determination is made as to the extent to which the age-group-specific correction value, discussed below, is to be taken into account. In other words, the longer the outdoor activity time, the greater the correction value is determined to be, and the shorter the outdoor activity time, the smaller the correction value is determined to be.

Further, the video image analyzing unit 520 performs processing for detecting overlapping of people in the video image and processing for detecting those who are not wearing masks in the video image. The processing for detecting overlapping of people in the video image and processing for detecting those who are not wearing masks in the video image will be described later.

The correction unit 530 is a specific example of the correction unit 12 described above. The correction unit 530 measures the body surface temperature of the admittee 22 from the thermal video image captured by the thermal camera 100. The correction unit 530 corrects the body surface temperature of the admittee 22 using a correction value calculated by the calculation unit 510. The age and the outdoor activity time determined by the video image analyzing unit 520 are taken into account by the calculation unit 510 when it calculates the correction value. The correction unit 530 issues (sends a notification of) an alert when the corrected body surface temperature is equal to or greater than a threshold value (e.g., 37.5° C.). The alert may be displayed on a monitoring terminal 600 installed in a security room or the like. By this configuration, a security guard can check the alert notification.

Next, an operation flow of the correction system 1000 will be described with reference to FIG. 4. First, as shown in the lower left of FIG. 4, the correction system 1000 is provided with a DB 540 for identification for identifying the employee 21 and an authentication DB 550 for recording the result of authentication. The DB 540 for identification and the authentication DB 550 may be provided in the correction apparatus 500 described above. The DB 540 for identification stores the ID 541 for identifying the employee 21, the age 542 of the employee 21, and feature amount 543 of the employee 21 in correspondence with each other. The authentication DB 550 records authentication time 551 as the result of authentication. The authentication of the employee 21 may be performed by: (A) face authentication using the visible light camera 200; (B) otoacoustic authentication using the wearable clinical thermometer 400 of an ear-type; or (C) by determining the shape of the heat source using the thermal camera 100.

It is also assumed that the correction system 1000 includes an external parameter input 700 as shown in the middle right row of FIG. 4. The correction system 1000 has time 701 and temperature 702 input thereto from the outside. The temperature 702 may be measured with a thermometer or obtained from the Internet or the like.

First, measurement of a body temperature using a wearable clinical thermometer (S100) will be described. First, in performing temperature measurement using a wearable clinical thermometer (S100), the body temperature of the employee 21 is measured (S101) and the body temperature of the employee 21 is monitored (S102). The result of measurement of the body temperature (S101) is used to correct the body surface temperature. Based on the result of monitoring of the body temperature (S102), an alert is output in the case where the employee 21 has a fever or has a low body temperature (S103). Thus, a change in the physical condition of the employee 21 can be detected and the health of the employee 21 can be managed.

Next, measurement of a body surface temperature using a thermal camera (S200) will be described. The body surface temperature of the employee 21 is measured (S201) and the body surface temperature of the admittee 22 is measured (S202).

Next, analysis of a visible light video image captured by a visible light camera (S300) will be described. The entrance of the facility X is a suitable location for screening because every admittee 22 passes through it, but the body surface temperature of each admittee 22 cannot be measured when people overlap each other in the video image. In performing analysis of a visible light video image (S300), the age of the admittee 22 is estimated (S301), the outdoor activity time of the admittee 22 is estimated (S302), it is determined if there is an overlapping of people in the video image (S303), those whose body surface temperature cannot be measured due to accessories and the like are detected (S304), and those who are not wearing a mask are detected (S305).

When overlapping of people in the video image is detected (S303), or when a person whose body surface temperature is unmeasurable due to accessories and the like (e.g., caps, masks) is detected (S304), an alert indicating that the body surface temperature is unmeasurable is output (S306). When a person who is not wearing a mask is detected (S305), an alert indicating that the admittee 22 is not wearing a mask is output (S307). Thus, the correction system 1000 can improve the capability of screening for the admittee 22.

Next, the correction of the body surface temperature (S400) will be described. First, the body temperature measured with the wearable clinical thermometer 400 is compared with the body surface temperature measured with the thermal camera 100 (S401). It should be noted that the measured body temperature which deviates significantly from the normal temperature of the employee 21 (determined, for example, in S102) may be excluded from the analysis. Next, a correction value is calculated on the basis of the comparison result (S402), and an age-group-specific correction value (also referred to as an age-group-specific correction table 560) is determined (S403). In the age-group-specific correction table 560, the age groups and the correction values are stored in correspondence with each other. Here, the correction table may be generated in accordance with attributes other than age.

When calculating a correction value in S402, parameters such as outdoor activity time P1 of the employee 21, chronological age P2, time slot P3, and outside temperature P4 of the employee 21 are taken into account. The outdoor activity time P1 is taken from the authentication time 551 stored in the authentication DB 550. The outdoor activity time P1 may be set, for example, according to two of the adjacent authentication times 551. The chronological age P2 is taken from the age 542 in the DB 540 for identification upon success in the authentication. The time slot P3 and the outside temperature P4 are taken from the external parameter input 700. The outside temperature P4 may be taken from a thermometer or the Internet.

For example, it can be said that if the outside temperature P4 is low, the body surface temperature decreases as the outdoor activity time P1 increases, and therefore the difference between the body temperature and the body surface temperature will be large. If the outside temperature P4 is high, the body surface temperature increases as the outdoor activity time increases, and therefore the difference between the body temperature and the body surface temperature will be small. Therefore, it is possible to determine a more appropriate correction value by taking into account the outdoor activity time P1 and the outside temperature P4.

Regarding the time slot P3, it is known that the body temperature in the evening is about 1° C. lower than that in the morning. Therefore, it is possible to determine a more appropriate correction value by taking into account the time slot P3.

Specifically, the outdoor activity time P1 and the outside temperature P4 are used to correct a body surface temperature. The chronological age P2 is used for the age in the age-group-specific correction table 560. The time slot P3 is used to determine the age-group-specific correction table for each time slot (for example, every 30 minutes).

Next, the estimated age of the admittee 22 is obtained (S404), and the estimated outdoor activity time is obtained (S405). Next, a correction value corresponding to the estimated age is determined from the age-group-specific correction table 560 (S406). As described above, the extent to which an age-group specific correction value is to be taken into account is determined according to the estimated outdoor activity time. Next, the body surface temperature measured by the thermal camera 100 is acquired (S407), and the correction value determined in S406 is added to determine the body surface temperature (S408). Finally, when the determined body surface temperature is equal to or greater than the threshold value, an alert is output (S409).

It is known that the body surface temperature of the elderly is about 0.2° C. lower than that of the young. Therefore, it is possible that the appropriate correction value of a body surface temperature varies from age to age. For example, the effect of an outside temperature on a body surface temperature of the elderly may differ significantly from that of the young. In such a case, a correction value for the elderly should be determined to be lower than a correction value for the young.

The correction system 1000 can correct the body surface temperature with high precision by performing age estimation of the admittee 22. Of course, attributes are not limited to age, and other attributes such as gender, race, etc. may be taken into account.

Next, a correction method according to the present example embodiment will be described in detail with reference to FIG. 5. The horizontal direction in FIG. 5 represents a time, and the right side thereof represents a slower time. The interval between adjacent vertical axes in the figure corresponds to 10 minutes. FIG. 5 shows a case where a 55-year-old employee A, a 70-year-old employee B, and a 35-year-old employee C have their body surface temperatures measured at an entrance of a facility approximately every 30 minutes.

First, the employee A measures his/her body surface temperature, 10 minutes after this the employee B measures his/her body surface temperature, and 10 minutes after this the employee C measures his/her body temperature (S201*a*). Then, a correction value is calculated taking into account the outdoor activity time P1, the chronological age P2, the time slot P3, and the outside temperature P4 (S402*a*), and an age-group-specific correction value or an age-group-specific correction table 560 is determined (S403*a*). Thereafter, the age of the admittee 22 is estimated (S301), the outdoor activity time is estimated (S302), and the temperature of the admittee is determined by adding together (or subtracting) the measured value and the correction value (S407*a*). That is, the body surface temperature is corrected by the age-group-specific correction table 560 determined (trained) in advance (for example, 30 minutes earlier).

Further, in the next 30 minutes following S201*a*, the body surface temperature is measured every 10 minutes in the order of the employee B, the employee C, and the employee A (S201*b*), and a correction value for the body surface temperature is calculated (S402*b*). Here, the outdoor activity time P1 is determined by performing identity authentication. Specifically, the outdoor activity time P1 is the elapsed time from the previous authentication time, and outdoor activity time P1 of the employee A is determined to be 50 minutes. Then, an age-group specific correction value is determined (S403*b*). Then, the body temperature of an admittee is determined by adding (or subtracting) the body surface temperature of the admittee and the correction value (S407*b*). The body temperature of the employee is constantly monitored (S102).

FIG. 6 illustrates the age-group-specific correction table 560 created in the above example. In the case of FIG. 5, a new correction value is determined every 30 minutes.

Next, the effect achieved by the second example embodiment will be described. In some cases, a thermal camera is installed near the entrance of a facility in order to screen persons entering the facility to determine whether or not they have a fever. In such a case, there arises a problem in that the result of measurement of a body surface temperature is affected by the outside temperature. In other words, there is a problem in that those persons who stayed outdoors where the temperature was low would have a low body surface temperature at the time of measurement, while those who stayed outdoors where the temperature was high would have a high body surface temperatures at the time of measurement. It is also considered that the influence of the outside temperature on the body surface temperature varies depending on the time of exposure to the outside temperature. Generally speaking, the influence of the outside temperature will be resolved in about 20 minutes after entering the facility.

As a method of increasing accuracy of body surface temperature measurement, there is a known method of inputting and adjusting parameters such as ambient temperature and emissivity. However, the problem with such method is that it is time-consuming and requires a knack. In addition, at locations where daily temperature fluctuations are large, tuning of the thermometer may be required for each time-of-day. There is also known a method in which a blackbody furnace for calibration of a thermal camera is installed and used as a temperature criterion to stabilize the temperature measurement. However, this method has a problem in that the influence of the outside temperature cannot be taken into account.

A correction system according to the second example embodiment can use an appropriate correction value taking into account the attributes of admittee. Thus, the correction system according to the second example embodiment can correct the body temperature of an admittee more precisely.

Third Example Embodiment

A third example embodiment is a specific example of the first example embodiment described above. A correction system according to the third example embodiment is different from the correction system according to the second example embodiment in that it does not have a visible light camera and does not estimate the attributes of admittees. Even in such a case, the correction system can correct body surface temperatures of the admittees on the basis of a body temperatures of an employees.

Figure 7:
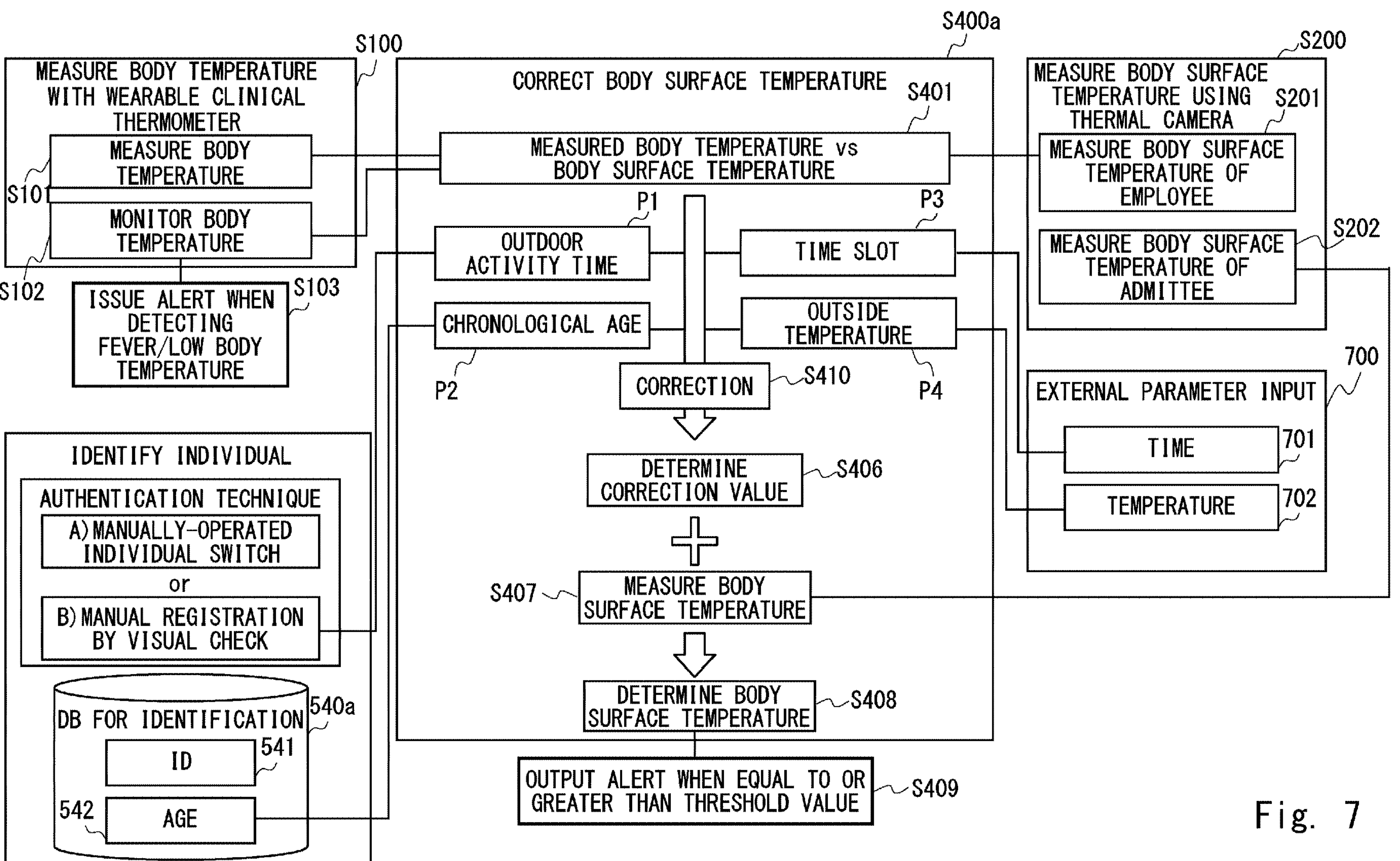
FIG. 7 is a schematic flowchart schematically showing a flow of a correction method according to a third example embodiment.

FIG. 7 is a flowchart showing an operation of the correction system according to the third example embodiment. Since the processing for performing measurement of body temperature using a wearable clinical thermometer (S100) and the processing for performing measurement of a body surface temperature using a thermal camera (S200) are the same as those described in the second example embodiment (FIG. 4), description thereof will be omitted. Since the configuration of the external parameter input 700 is the same as that of the second example embodiment (FIG. 4), description thereof will be omitted. FIG. 7 does not include video image analysis (S300) using a visible light camera described in the second example embodiment (FIG. 4).

The correction system according to the third example embodiment includes a DB 540*a* for identification. In the DB 540*a* for identification, it is not necessary to store the feature amount 543 as in the DB 540 for identification of FIG. 4, in which ID 541 and age 542 are stored in correspondence with each other.

Each employee 21 is identified by (A) a method in which individual switches are manually operated by each employee 21 or (B) performing a manual registration by visually checking each employee 21. In the method (A), for example, switches are provided at the entrance of the facility X, and each employee 21 inputs his/her ID 541 or the like. In the method (B), for example, another employee or the like visually checks the employee 21 or the like whose body surface temperature is to be measured and inputs the ID 541 or the like of the employee 21.

Comparing FIGS. 4 and 7, correction of the body surface temperature (S400) is replaced by correction of the body surface temperature (S400*a*). In FIG. 4, a correction value is calculated based on the result of measurement of each employee 21 (S402), and the age-group-specific correction table 560 is determined. On the other hand, in FIG. 7, a correction value applicable to admittee of all ages is determined based on the result of measurement of the employee 21 (S410).

Here, as in the second example embodiment, parameters such as the outdoor activity time P1, the chronological age P2, the time slot P3, and the outside temperature P4 are taken into account. The chronological age P2 of the employee 21 is acquired from the DB 540*a* for identification. Further, since the processing of S406 to S409 of the body surface temperature correction (S400) are the same as those described in the second example embodiment, description thereof will be omitted.

The correction system according to the present example embodiment can correct the body temperatures of admittees with high precision by using a correction value calculated on the basis of the body temperatures of the employees. Since the correction system according to the present example embodiment does not require a visible light camera, the cost for installing the system can be reduced. Moreover, since the correction system according to the example embodiment does not perform video image analysis using a visible light camera, the system allows for privacy of the admittees.

In the example described above, the program includes a set of instructions (or software codes) to cause the computer to perform one or more functions described in the example embodiments when read into the computer. The program may be stored in a non-transitory computer-readable medium or a tangible storage medium. By way of example, but not limitation, a computer-readable medium or substantial storage medium may include a random-access memory (RAM), a read-only memory (ROM), a flash memory, a solid-state drive (SSD) or other memory technology, a CD-ROM, a digital versatile disc (DVD), a Blu-ray disc (registered trademark), or other optical disc storage, magnetic cassette, magnetic tape, magnetic disc storage, or other magnetic storage devices. The program may be transmitted on a transitory computer-readable medium or a communication medium. By way of example, but not limitation, a transitory computer-readable medium or a communication medium includes an electrical, optical, acoustic, or other forms of propagating signals.

The present disclosure is not limited to the example embodiments described above and may be modified as appropriate to the extent that it does not deviate from the gist of the present disclosure. The present disclosure may be implemented by combining the example embodiments as appropriate.

Although the present disclosure has been described with reference to the example embodiments, the present disclosure is not limited to the above-mentioned example embodiments. Various changes in the configuration and details of the present disclosure can be made within the scope of the present disclosure that can be understood by those skilled in the art.

REFERENCE SIGNS LIST

1 CORRECTION APPARATUS
11 CALCULATION UNIT
12 CORRECTION UNIT
100 THERMAL CAMERA
200 VISIBLE LIGHT CAMERA
300 DISPLAY APPARATUS
400 WEARABLE CLINICAL THERMOMETER
500 CORRECTION APPARATUS
510 CALCULATION UNIT
520 VIDEO IMAGE ANALYZING UNIT
530 CORRECTION UNIT
540, 540*a* DB FOR IDENTIFICATION
541 ID
542 AGE
543 FEATURE AMOUNT
550 AUTHENTICATION DB
551 AUTHENTICATION TIME
560 AGE-GROUP-SPECIFIC CORRECTION TABLE
600 MONITORING TERMINAL
700 EXTERNAL PARAMETER INPUT
701 TIME
702 TEMPERATURE
10*a*, 10*b* DOOR
20 OUTDOORS
21 EMPLOYEE

What is claimed is:

1. A correction apparatus comprising:
at least one memory storing instructions and
at least one processor configured to execute the instructions to:
acquire a body surface temperature of a first person who has stayed outdoors for a predetermined time or longer from a video image captured by a thermal camera and calculate, on the basis of a result of measurement of a body temperature of the first person, a correction value to be used for correcting a body surface temperature; and acquire a body surface temperature of a second person different from the first person from a video image captured by the thermal camera and correct a body surface temperature of the second person on the basis of the correction value, wherein the at least one processor is further configured to execute the instructions to:

generate a correction table showing a correspondence relationship between a correction value for the body surface temperature of the first person and attributes of the first person.

2. The correction apparatus according to claim 1, wherein a wearable clinical thermometer is worn by the first person, and the at least one processor is further configured to execute the instructions to:

calculate the correction value to be used for correcting the body surface temperature on the basis of the result of measurement performed by the wearable clinical thermometer.

3. The correction apparatus according to claim 1, wherein the at least one processor is further configured to execute the instructions to:

estimate attributes of the second person on the basis of a video image captured by a visible light camera, determine, using the correction table, a correction value for the second person according to the attributes of the second person; and correct the body surface temperature of the second person on the basis of the determined correction value.

4. The correction apparatus according to claim 1, wherein an item of the attributes is age.

5. The correction apparatus according to claim 1, wherein the first person is an employee of a facility, and the second person is an admittee to the facility.

6. A correction method implemented by a computer, comprising:

acquiring a body surface temperature of a first person who has stayed outdoors for a predetermined time or longer from a video image captured by a thermal camera and calculating, on the basis of a result of measurement of a body temperature of the first person, a correction value to be used for correcting a body surface temperature; and acquiring a body surface temperature of a second person different from the first person from a video image captured by the thermal camera and correcting a body surface temperature of the second person on the basis of the correction value, wherein the correction method further comprises:

generating a correction table showing a correspondence relationship between a correction value for the body surface temperature of the first person and attributes of the first person.

7. The correction method according to claim 6, wherein a wearable clinical thermometer is worn by the first person, and the correction method further comprises:

calculating the correction value to be used for correcting the body surface temperature on the basis of the result of measurement performed by the wearable clinical thermometer.

8. The correction method according to claim 6, wherein the correction method further comprises:

estimating attributes of the second person on the basis of a video image captured by a visible light camera, determining, using the correction table, a correction value for the second person according to the attributes of the second person; and correcting the body surface temperature of the second person on the basis of the determined correction value.

9. The correction method according to claim 6, wherein an item of the attributes is age.

10. A non-transitory computer-readable medium storing a correction program for causing a computer to further perform processing of:

acquiring a body surface temperature of a first person who has stayed outdoors for a predetermined time or longer from a video image captured by a thermal camera and calculating, on the basis of a result of measurement of a body temperature of the first person, a correction value to be used for correcting a body surface temperature; and acquiring a body surface temperature of a second person different from the first person from a video image captured by the thermal camera and correcting a body surface temperature of the second person on the basis of the correction value, wherein the correction program causes a computer to further perform processing of:

generating a correction table showing a correspondence relationship between a correction value for the body surface temperature of the first person and attributes of the first person.

11. The non-transitory computer-readable medium according to claim 10, wherein a wearable clinical thermometer is worn by the first person, and the correction program causes a computer to further perform processing of:

calculating the correction value to be used for correcting the body surface temperature on the basis of the result of measurement performed by the wearable clinical thermometer.

12. The non-transitory computer-readable medium according to claim 10, wherein the correction program causes a computer to further perform processing of:

estimating attributes of the second person on the basis of a video image captured by a visible light camera, determining, using the correction table, a correction value for the second person according to the attributes of the second person; and correcting the body surface temperature of the second person on the basis of the determined correction value.

13. The non-transitory computer-readable medium according to claim 10, wherein an item of the attributes is age.

* * * * *